United States Patent Office 3,846,285
Patented Nov. 5, 1974

3,846,285
REGENERATIVE PROCESS FOR THE SELECTIVE HYDRODESULFURIZATION OF PETROLEUM RESIDUALS UNDER MILD CONDITIONS
Harold Beuther, Gibsonia, Sun W. Chun, Murrysville, and Angelo A. Montagna, Monroeville, Pa., assignors to Gulf Research & Development Company, Pittsburgh, Pa.
No Drawing. Filed Feb. 21, 1973, Ser. No. 334,476
Int. Cl. C10g 23/02
U.S. Cl. 208—216     11 Claims

ABSTRACT OF THE DISCLOSURE

A process for the hydrosulfurization of petroleum stocks under comparatively low hydrogen partial pressures, i.e. less than about 1,200 p.s.i.a., in contact with a catalyst containing Group VI and VIII metals, either with or without a Group IV-B promoter, supported on a particular carrier. The carrier is a substantially silica-free alumina prepared by drying and calcining a material comprising a mixture of alumina trihydrate and another alumina containing from about 1.2 to about 2.6 mole of water of hydration per mol of $Al_2O_3$.

---

Our invention relates to a process for the hydrodesulfurization of a petroleum stock employing comparatively low hydrogen partial pressures and a specific catalyst. More particularly, our invention relates to such process in which the hydrogen partial pressure is less than about 1,200 p.s.i.a. and wherein the catalyst is supported on a carrier obtained by drying and calcining a material consisting of two different crystalline alumina hydrates.

The hydrosulfurization of petroleum stocks by contacting them with hydrogen and a catalyst containing hydrogenating components has previously been suggested in the art. Usually, these processes require the use of an elevated temperature and pressures ranging up to several thousand p.s.i.g. When attempting to hydrodesulfurize materials containing high boiling components, additional problems are encountered, for example, a more rapid coking and deactivation of the catalyst. This particular problem is extremely severe when treating stocks containing residual components, i.e. the most difficultly vaporizable portion of the crude petroleum when generally cannot be vaporized under atmospheric pressure without effecting thermal decomposition. Residual components can be considered as materials boiling above 950° to 1,000° F.

In addition to the increased coking tendency of residual components, these heaviest materials in the crude oil also contain increased quantities of metalliferous contaminants. In fact, almost all metalliferous contaminants are contained in the residual components or residual fraction of a crude oil. When a material containing residual components is subjected to the traditional hydrodesulfurization techniques, the metal contaminants, or at least large portions thereof, are removed from the petroleum stock and deposited on the surface of the catalyst resulting in a "plating" of the catalyst and its rapid deactivation.

In an effort to offset, at least partially, these adverse effects of hydrodesulfurizing residual-containing stocks, it has previously been suggested to employ comparatively high hydrogen partial pressures, e.g. 1,500 to 2,000 p.s.i.g. and higher. Generally, it is believed that the higher hydrogen partial pressures reduce the quantity of coke deposited on the surface of the catalyst, thus alleviating, to some extent, one of the difficulties. It is not believed, however, that the higher hydrogen partial pressures in any way reduce the quantity of metals deposited on the catalyst and in many instances metals deposition is more severe at the higher pressures. As will readily be understood, the employment of high pressures requires the employment of heavier reactors and equipment and presents a larger power requirement for purposes of compression.

We have discovered a process for the comparatively low pressure hydrodesulfurization of petroleum stocks, particularly residual-containing stocks, which process provides extended and satisfactory catalyst life. In accordance with the process of our invention, a hydrocarbon stock boiling above about 400° F. and containing a substantial quantity of sulfur is contacted with a catalyst and hydrogen at an elevated temperature and a hydrogen partial pressure no greater than about 1,200 p.s.i.a. The catalyst employed in our process comprises a minor amount of a hydrogenating component composited with a major amount of a particular alumina.

The feed stocks suitable for treatment in the process of our invention include substantially any hydrocarbon stock boiling above about 400° F., such as, for example, synthetic crude oils derived from shale oil, tar sands or coal, substantially full petroleum crudes boiling above 400° F., topped crudes, reduced crudes, atmospheric tower bottoms, vacuum tower bottoms or any individual fraction. Thus, the feed stock can be a topped crude from which only the lowest boiling materials, such as naphtha boiling range materials, have been removed or it can be a residual fraction boiling above about 950° to 1,000° F. Similarly it can be any of the intermediate distilled fractions, such as, furnace oil boiling from 400° to about 650° F. or a gas oil boiling from about 650° to about 950° F. The feed stock can also be a fraction or fractions separated on a basis of solubility rather than boiling range, such as, for example, an asphaltene and maltene fraction. Preferably, however, we employ a feed stock which contains a substantial quantity of residual components, asphaltic contaminants and metalliferous components. Generally, we find that our process becomes more advantageous in the treatment of stocks wherein such components, contaminants and compounds comprise an increased proportion of the total charge stock. Accordingly, we find our process to be particularly advantageous in the treatment of residual fractions boiling substantially above 950° F.

These feed stocks, particularly residual stocks, can comprise materials containing up to about 5 or 6% by weight sulphur although they usually do not contain more than about 4% mg. weight sulfur. Further, the feed stocks employed in our invention can contain substantial quantities of metalliferous contaminants, e.g. greater than about 50 p.p.m. of metals, particularly nickel and vanadium. Additionally, the feed stocks treated in our process can be materials which have been treated previously for the removal of sulfur in which case our process is effective to provide a product having an extremely low sulfur content, e.g. less than about 0.5% by weight.

As used herein, the terms "residual," "residue" or "residual components" are meant to describe the most difficultly vaporizable portions of crude oils which normally cannot be distilled, in the absence of a vacuum, without effecting decomposition of the stock. Indicative of such residual components is a Conradson Carbon Number usually greater than about 1. Such residual components can typically be isolated as a separate fraction by vacuum distillation, i.e. a vacuum tower bottoms, and generally boils above about 950° or 1,000° F. The amount of residual components in a crude petroleum oil can vary from substantially zero, as in a Pennsylvania crude, up to as high as about 25% by volume, such as in a Kuwait crude. It will be understood, of course, that the concentration of residual components in a fraction of a crude oil, such as a topped crude or reduced crude, will be dependent upon the original concentration of residual components in the full crude and the amount of lighter materials removed. Generally, the feed stocks employed in the process of our invention will contain at least 2% by volume residual components and preferably at least about 5% by volume. It will also be understood that the process of our invention provides increased advantages when treating stocks containing increased quantities of residual components.

The operating conditions employed in the process of our invention comprise a temperature in the range from about 600° to about 1,000° F. and preferably from about 650° to about 800° F. The space velocity can be in the range from about 0.1 to about 10.0, preferably less than about 5.0 and more preferably from about 0.2 to about 2.0 volumes of charge stock per volume of catalyst per hour. The hydrogen feed rate employed ranges from about 500 to about 10,000 standard cubic feet per barrel of feed stock, preferably is in the range from about 1,000 to 8,000 standard cubic feet per barrel and more preferably is in the range from about 2,000 to about 6,000 standard cubic feet per barrel. The hydrogen partial pressure employed in the process of our invention is in the range from about 50 to about 1,200 p.s.i.a., preferably less than about 1,000 p.s.i.a. and even more preferably less than about 800 p.s.i.a., with superior results being obtained with hydrogen partial pressures as low as 500 or 400 p.s.i.a. Usually, we prefer to employ hydrogen partial pressures of at least 200 p.s.i.a. The total pressures employed in our process do not greatly exceed the hydrogen partial pressures and we limit the maximum total pressure to a maximum of about 1,500 p.s.i.g. and preferably we operate at a total pressure of less than about 1,000 p.s.i.g.

The catalyst employed in our process comprises a minor proportion of a metalliferous hydrogenating component, such as the Group VI and Group VIII metals, their oxides and sulfides, composited with a major amount of a particular alumina. Preferably, the hydrogenating component is one or more of the metals nickel, cobalt, platinum, palladium, molybdenum and tungsten. The particular alumina required in our process must be substantially silica-free. Thus, any silica incorporated cannot be more than contaminant level, i.e. less than 1% by weight and preferably less than about 0.5% by weight. Accordingly, the alumina employed in our process is not to be a so-called silica-stabilized alumina, i.e. a material containing silica in an amount from about 1 up to about 5 or 6% by weight. Additionally, the catalyst can be promoted with from about 1% to about 10% by weight, preferably at least about 2.5% of a Group IV–B metal, i.e. titanium, zirconium and hafnium. We prefer to employ catalysts containing no more than about 8% by weight Group IV–B metal and of these metals we prefer to employ titanium and zirconium, particularly titanium. We also find it advantageous if the Group IV–B metal is not incorporated into the carrier, but rather is deposited on the carrier such as by impregnation of the calcined carrier.

The particular alumina carrier or support employed in our process is a mixture of two different aluminas obtained by calcining two different crystalline alumina hydrate precursors. One of the alumina hydrates is an alumina trihydrate, while the other is a crystalline alumina hydrate containing from about 1.2 to about 2.6 mols of water of hydration per mol of $Al_2O_3$, i.e. an "alumina dihydrate." Broadly, the alumina trihydrate can be employed in an amount from about 1% to about 35% by weight, while the alumina dihydrate is present in an amount from about 65% to about 99% by weight, both based upon total alumina hydrate. Preferably, the alumina trihydrate comprises at least about 2% by weight and more preferably at least about 5% by weight of the total alumina hydrate. Further, we prefer that the alumina trihydrate comprise less than about 30% by weight of the total alumina hydrate.

Generally, we have found that carriers of the type described above have superior aging characteristics providing extended catalyst life and, unexpectedly, are regenerable, i.e. substantially fresh catalyst activity can be achieved upon regeneration and aging characteristics after regeneration are substantially equal to those of a fresh catalyst. These properties of the catalyst employed in our invention provide advantages over prior art catalysts even when the prior art catalysts have higher initial activities since improved aging and regenerability far outweigh the slight advantage of initial activity over any period of extended operation. In many instances, the improved aging rate will offset a higher initial activity after only a few days of operation.

In this connection a particularly preferred carrier to be employed in our invention comprises less than about 18% by weight alumina trihydrate based upon total alumina hydrate. We have found that such carriers not only possess the general characteristics of improved aging and regenerability but also provide the further advantage of high initial activity. Particularly, high initial activity can be obtained when employing carriers containing less than about 15% by weight alumina trihydrate based upon total alumina hydrate.

Although the alumina carrier employed in our invention can be prepared by separately forming the two alumina hydrates, separately calcining the hydrates and then admixing the two different aluminas resulting from the calcination, we prefer to admix the two alumina hydrates and then calcine this admixture. Advantageously, however, we form the two alumina hydrates together and then calcine the resulting mixture of hydrates. It is believed that this latter technique results in a more intimate admixture of two hydrates and a more complete and uniform dispersion of the trihydrate through the dihydrate.

The separate preparation of the crystalline alumina trihydrate can be accomplished by means well known to the art and, accordingly, will not be discussed herein. The separate preparation of the crystalline alumina dihydrate is accomplished by precipitation from a solution of an aluminum salt while maintaining a pH in the range from 7 to about 12 and preferably from about 8 to about 10. It is important that a pH within the above ranges be maintained and the existence of even localized zones of lower pH is to be avoided. This maintenance of a high pH can be facilitated through effecting the precipitation by adding the solution of the aluminum salt, e.g. aluminum chloride, to the basic precipitant, e.g. aqueous ammonium hydroxide, while stirring vigorously. Further, it is important that the precipitated crystalline alumina dihydrate be dried rapidly, since the precipitate as formed is unstable and tends to transform into other alumina hydrates having a higher or lower water of hydration content.

As mentioned above, the two different and separately prepared alumina hydrates can then be calcined and the two different resulting aluminas can be admixed in the desired portions. Preferably, however, the two different and separately prepared alumina hydrates are admixed while still in the hydrate form and thereafter the admixture of the alumina hydrates is calcined.

In accordance with the particularly preferred method of preparing the alumina carrier employed in our invention, the two different alumina hydrates are formed together. This can be accomplished by effecting precipitation from a solution of an alumina salt so as to form the crystalline alumina hydrate containing from 1.2 to 2.6 mols of water of hydration. In order to effect this formation of the aluminum dihydrate, it is essential that a pH in the range from 7 to 12 be maintained at sometime during the precipitation step. Thus, for example, a gel can be formed from the solution of the aluminum salt at a pH in the range from about 4 to about 7 and then the pH can be increased to the range of 7 to about 12. Alternatively, a pH in the range from 7 to about 12 and preferably from about 8 to about 10 can be maintained throughout the precipitation step. Regardless of the particular technique employed during the precipitation step, the precipitated alumina hydrate, which initially is almost entirely in the form of crystalline alumina dihydrate, is partially transformed to alumina trihydrate by contacting the alumina dihydrate precipitate with liquid water, as distinguished from water vapor. This can be effected by maintaining the precipitate in an aqueous reaction medium or by washing with water or both. When the transformation to the trihydrate has progressed to the desired extent, the mixed hydrates are then dried. Upon drying, the alumina dihydrate becomes stable and further transformation is prevented, even upon recontacting with water.

It is believed that this latter technique of forming the two different alumina hydrates together results in a more uniform distribution of the trihydrate through the mass of dihydrate extending down to the micro level. As distinguished from this, the techniques of separately forming the two different alumina hydrates and then admixing either the hydrates or the calcined aluminas of necessity limits the admixture to one existing only on the macro scale.

Advantageously, in the particularly preferred method of preparation wherein the two alumina hydrates are formed together, the precipitation from the solution of the aluminum salt is conducted in the presence of an acetate ion. This can be accomplished, for example, by adding acetic acid to the aluminum solution prior to precipitation. It has been found that the presence of the acetate ion retards transformation of the precipitated alumina dihydrate to alumina trihydrate thereby facilitating control of the amount of alumina trihydrate formed during the transformation step. Additionally, it is advantageous to maintain the presence of the acetate ion during the washing operation. This can be accomplished by employing, for example, a dilute ammonium acetate solution as the wash medium. Even when employing an acetate ion during the precipitation step, the utilization of a wash medium which does not contain an acetate ion tends to wash out of the precipitate the acetate ion introduced into the precipitation step. When washing a fixed mass of precipitate, this can result in substantially complete removal of the acetate ion from the inlet end of the precipitate resulting in extremely rapid and substantially total transformation from the dihydrate to the trihydrate at this end of the mass, while the downstream end of the mass, which still contains some acetate ions, transforms more slowly and to the desired extent.

In the precipitation from a solution of an aluminum salt employed in the preparation of the alumina hydrate containing from 1.2 to 2.6 mols of water of hydration, any aluminum salt may be employed. For instance, aluminum nitrate, chloride, acetate, formate, fluoride, sulfate and other salts of aluminum may be used. Also, a variety of bases, such as, sodium hydroxide, ammonium hydroxide, potassium hydroxide, etc. may be employed to precipitate the aluminum hydrate. We prefer, however, to employ salts of aluminum and bases which do not give reaction by-products or salts which are difficult to separate from the desired alumina hydrates. For instance, if aluminum sulfate and/or sodium hydroxide are employed or even if aluminum sulfate or amonium hydroxide are employed, sulfate salts are formed which are difficult to remove by water washing. On the other hand, if aluminum nitrate, aluminum chloride or an aluminum salt of an organic acid is used and a base, such as ammonium hydroxide is employed, the salts which are formed are readily soluble in water and can easily be removed by water washing from the alumina hydrate. Regardless of the specific aluminum salt and base that are used, the final product should be substantially free of such salts.

Additionally, we have found that the catalysts required in our process have the further advantage of being regenerable. Regeneration can be accomplished either by solvent extraction with an aromatic solvent preferably one containing a good hydrogen transfer agent such as hydrofuran and anthracene, or by oxidative burn-off. The solvent extraction can be accomplished in the presence of at least about 500 SCF of hydrogen per barrel of solvent, at pressures of about 250 p.s.i.g. or greater and at temperatures of about 500° F. or greater. The liquid hourly space velocity employed is usually greater than about 0.1 volumes of solvent per volume of catalyst per hour. Usually, we prefer to employ somewhat more severe conditions for the solvent treatment such as pressures of at least about 500 p.s.i.g. and advantageously greater than about 1,000 p.s.i.g., temperatures of at least about 700° F., hydrogen feed rates of at least about 1,000 scf./b. of solvent and liquid hourly space velocities of at least about 0.2 volumes of solvent per volume of catalyst per hour. Generally, however, there is not believed to be any particuular advantage to be gained by employing pressures greater than about 3,000 or 4,000 p.s.i.g., temperatures greater than about 900° F., space velocities greater than about 2.0 or hydrogen feed rates greater than about 10,000 scf./b. Normally, the regeneration by solvent treatment is accomplished within about 20 to 30 hours. The oxidative burn-off can be accomplished by techniques well known in the art and the temperature is maintained at a level of 1,000° F. or lower.

The carrier employed in our process can be in the form of irregular particles obtained by crushing or grinding or it can be in the form of more regular shapes such as cylindrical extrudates or spherical beads. In the preparation of beads such as for use in fluidized bed operations or in the preparation of extrudates of enhanced strength the use of binder materials such as silica, for example in the form of silicic acid or synthetic and natural clays, can be employed. Such binders are persent in an amount from about 8 to 10% by weight up to about 30% by weight based upon the total.

In order to illustrate our invention in greater detail, reference is made to the following examples.

EXAMPLE 1

A solution of an aluminum salt was prepared by dissolving 9460 grams of $AlCl_3 \cdot 6H_2O$ in 40 liters of distilled water. To this solution was added 1,000 grams of glacial acetic acid to provide a final solution having a pH of 1.49 at 24° C. A separate dilute ammonium hydroxide (8% $NH_3$) solution was prepared by dissolving 10 liters of concentrated ammonium hydroxide in 25 liters of distilled water. The dilute ammonium hydroxide solution was added to the aqueous ammonium chloride and acetic acid solution with stirring to form a gel at a pH in the range from 4 to 5 at 25° C. Addition of the ammonium hydroxide solution was then continued to raise the pH of the final mixture to 8. Transformation was effected by stirring this material from 10 to 15 minutes after the pH of 8 was reached. Further transformation was effected by placing the material on a filter and washing with a dilute ammonium hydroxide solution (0.028% $NH_3$) until the conductivity of the filtrate reached 1,000 p.p.m.

The filter cake consisted of two discrete phases or layers at the end of the washing operation. The top layer represented about 10 to 15% by volume of the total filter cake and consisted mainly of bayerite and was white and gritty. The lower layer was gelatinous, substantially uniform and consisted of about 10 to 15% bayerite dispersed in alumina gel. The top layer was discarded and the lower layer was oven dried at 250° F. for 16 hours and thereafter sized to 14 x 30 mesh granules and calcined at 900° F. for 16 hours. This calcined material was then impregnated with nickel, cobalt and molybdenum solutions after which it was again oven dried at 250° F. for 16 hours and then calcined at 900° F. for 16 hours. The final catalyst contained 0.5% by weight nickel, 1% by weight cobalt and 8% by weight molybdenum.

EXAMPLE 2

In this example, 6750 grams of $Al(NO_3)_3 \cdot 9H_2O$ was dissolved in 22 liters of distilled water. In a separate vessel, two liters of distilled water were combined with 225 grams of glacial acetic acid and the pH of this solution was adjusted to 9.0 by the addition of ammonium hydroxide. The aluminum nitrate solution was then added to the separate vessel containing the acetic acid and ammonium hydroxide solution. Vigorous stirring was continued during the addition and the pH of the combined solutions was maintained at 9 with the addition of further ammonium hydroxide. After all of the aluminum nitrate solution had been added, stirring was continued for an additional 10 minutes to effect transformation. The resulting precipitate was then filtered and the filter cake was washed with 75 liters of a wash solution consisting of 100 grams of ammonium acetate in 100 liters of distilled water thereby effecting further transformation. After washing, the filter cake was a single, substantially uniform, phase or mass and consisted of about 25.5% bayerite dispersed through the gelatinous alumina dihydrate. This filter cake was then oven dried at 250° F.

EXAMPLE 3

In this example, two comparative runs were conducted employing operating conditions of a temperature of 700° F., a hydrogen partial pressure of 1,000 p.s.i.g., a liquid hourly space velocity of 1 and a hydrogen feed rate of 5,000 standard cubic feet per barrel. In both runs, the feed stock was a 50% reduced Kuwait crude having a 10% point of about 700° F., a 50% point of about 850° F. and a sulfur content of nominally 4% by weight. In one of the runs of this example, a catalyst as described in Example 1 and required by our invention was employed, while in the other run the catalyst employed a commercially available alumina support. Both catalysts contained 0.5% by weight nickel, 1% by weight cobalt and 8% by weight molybdenum based upon the total catalyst. The following Table I shows the inspection for the feed stock together with the average product inspections during the period from 8 to 48 hours of each of the two separate runs.

TABLE I

| | Feed stock | Commercial alumina support | Alumina support of this process |
|---|---|---|---|
| Sulfur, percent by wt | 4.07 | 1.47 | 1.18 |
| Gravity, °API | 14.7 | 20.5 | 20.8 |
| Vanadium, p.p.m | 62 | 14 | 32 |
| Nickel, p.p.m | 21 | 10 | 14 |

During the course of these two runs, the sulfur content of the product obtained when employing the commercial alumina carrier increased from a level of about 1.25% by weight sulfur at 12 hours of operation up to about 1.6% by weight sulfur at 44 hours. As distinguished from this, the sulfur content of the product obtained in accordance with our invention was consistently lower than that obtained with the commercial alumina carrier and at a period of 44 hours was only about 1.2% by weight sulfur, while the product obtained with the commercial alumina carrier was greater than about 1.25 at only 12 hours and increased consistently thereafter.

It will also be noted from the data shown in Table I above that the process of our invention is not only effective to provide a product having a lower average sulfur content but that a lower quantity of metals was removed from the feed stock in accordance with our invention as compared to the metals removal effected when employing a commercial catalyst. This reduced demetallization has the added advantage of prolonging catalyst life.

EXAMPLE 4

In this example, the same feed stock used in Example 3 was employed in two runs; one employing the commercial catalyst of Example 3 and the other employing a catalyst having the same metals content as the commercial catalyst on a carrier of the type prepared in Example 1. The conditions of both runs included a hydrogen feed rate of 5,000 scf./b., a pressure of 500 p.s.i.g. and an LHSV of 0.5. In the run utilizing the commercial catalyst, a temperature of 730° F. was employed, while a temperature of only 710° F. was employed in the run embodying our process.

In the run conducted in accordance with our invention, the sulfur content initially obtained in the product was less than about 1.0% by weight. During the early part of the run, there was the typical rapid deactivation of the catalyst normally encountered with any catalyst so that after about 50 hours of operation the sulfur level in the product rose to about 1.1% by weight and the sulfur level appeared to stabilize at about 1.2% by weight after about 100 hours of operation. This run was continued for a period of 45 days (about 1080 hours) at which time the sulfur content in the product had risen to a level of only about 1.3% by weight.

As distinguished from this operation, the run employing the commercial catalyst and employing a temperature 20° higher was never able to produce a product with 1% sulfur. Furthermore, the run employing the commercial catalyst evidenced a continuing and rather rapid rate of deactivation. In fact, the sulfur level in the product was greater than about 1.25% by weight after only 50 hours of operation and continued to increase somewhat rapidly so that the sulfur level in the product approached 2.0% by weight at 250 hours of operation. This run was terminated at 400 hours when the sulfur content in the product increased to about 2.15% by weight.

From these data, it will be seen that the process of our invention is effective to produce a low sulfur content product and that the catalyst is not only more active but more stable than a typical commercial catalyst during extended operation.

EXAMPLE 5

In this example, the same feed stock and the same operating conditions of pressure, space velocity and hydrogen feed rate as used in Example 4 were employed. Further, the metalliferous hydrogenating components employed in the catalyst of this example were also the same as used in Example 4. The carrier employed in this example, however, was comprised of equal parts by weight of the alumina required in our process and the commercial alumina employed as a carrier in Example 4. The temperature employed in the run of this example was 720° F.

As might be expected, the results obtained in this run were not quite as good as obtained in the run of Example 4 wherein the catalyst carrier comprised 100% of the alumina required in our process, but the results were still significantly superior to those achieved when employing the commercial alumina carrier. Thus, at a period of about 50 hours, the run of this example produced a product containing about 1.45% by weight sulfur, which is a somewhat higher sulfur content product than obtained at a comparable period of operation with the commercial alumina support. However, the aging rate obtained in the present example was substantially less than with the commercial alumina carrier. During the operating period from about 150 to about 200 hours in the present run, the sulfur content of the product remained at less than about 1.7% and at about 250 hours, the sulfur content of the product was still less than about 1.75% by weight. As distinguished from this, the commercial alumina at a comparable period of time was producing a product having an excess of 1.9% by weight sulfur and rapidly approaching 2% by weight sulfur. Further, this advantageous result of the present example was obtained when operating at a temperature 10° F. less than employed with the commercial carrier. From these data, it will be seen that the process of our invention can be practiced with advantageous results even when the alumina carrier required in our process is mixed with substatial quantities of another alumina.

ing Table III sets forth the operating conditions employed and product inspections obtained at various intervals during the course of the run.

TABLE III

| On-stream time | Operating conditions | | | | Product inspections | | | |
|---|---|---|---|---|---|---|---|---|
| | T (° F.) | P (p.s.i.g.) | LHSV | $H_2$ rate (s.c.f./bbl.) | S (percent) | Ni (p.p.m.) | V (p.p.m.) | $H_2$ percent |
| Feed | | | | | 4.07 | 21.3 | 62 | 11.14 |
| 8–32 | 700 | 250 | 1.0 | 5,000 | 2.15 | 24 | 50 | 11.56 |
| 32–56 | 725 | 250 | 1.0 | 5,000 | 1.82 | 25 | 40 | 11.67 |
| 56–80 | 740 | 250 | 1.0 | 5,000 | 1.99 | 27 | 45 | 11.46 |
| 80–152 | 740 | 250 | 0.5 | 5,000 | 1.55 | 22 | 37 | 11.57 |
| 192–236 | 750 | 250 | 0.25 | 5,000 | 1.12 | 23 | 32 | 11.51 |
| 236–260 | 750 | 150 | 0.25 | 5,000 | 1.68 | 22 | 39 | 11.30 |
| 268–292 | 700 | 250 | 1.0 | 5,000 | 2.97 | 21 | 55 | 11.34 |
| 292–316 | Flushed with gas oil, upflow, at 250 p.s.i.g., 550° F., 1 LHSV, 5,000 s.c.f. $H_2$/bbl. for 24 hrs. | | | | | | | |
| 324–340 | 700 | 250 | 1.0 | 5,000 | 2.97 | | | 11.39 |
| 356–380 | Flushed with gas oil, upflow, at 500 p.s.i.g., 675° F., 1 LHSV, 5,000 s.c.f. $H_2$/bbl. for 24 hrs. | | | | | | | |
| 388–412 | 700 | 250 | 1.0 | 5,000 | 2.91 | 21 | 57 | 11.22 |
| 412–432 | Flushed with anthracene oil, downflow, at 500 p.s.i.g., 750° F., 1 LHSV, 5,000 s.c.f. $H_2$/bbl. for 20 hrs. | | | | | | | |
| 440–464 | 700 | 250 | 1.0 | 5,000 | 2.47 | 20 | 52 | |
| | | | | Oxidative burnoff, downflow | | | | |
| 472–480 | 700 | 250 | 1.0 | 5,000 | 2.02 | 23 | 49 | |

EXAMPLE 6

In this example, the feed stock employed was the 700° F.+ fraction of a 53% reduced Kuwait crude which had been subjected to a commercial hydrodesulfurization operation to provide a fraction containing about 1% by weight sulfur. Again, the catalyst employed was a nickel, cobalt and molybdenum catalyst supported on the alumina required by our invention similar to the catalyst described in Examples 3 and 4. During the course of the run of this example, the temperatures employed were varied over the range from 675° to 725° F., the pressure was varied from 500 to 2,000 p.s.i.g. and the space velocity was varied from 0.5 to 2.0. The various combinations of operating conditions together with the sulfur content of the product obtained at those conditions is shown in Table II below.

TABLE II

| Temperature, ° F. | Pressure, p.s.i.g. | LHSV, v./v./hr. | S, percent by weight |
|---|---|---|---|
| 675 | 2,000 | 0.5 | 0.3 |
| 675 | 2,000 | 1.0 | 0.45 |
| 675 | 2,000 | 1.5 | 0.6 |
| 700 | 2,000 | 0.5 | 0.22 |
| 700 | 2,000 | 1.0 | 0.35 |
| 700 | 2,000 | 1.5 | 0.48 |
| 700 | 2,000 | 2.0 | 0.54 |
| 700 | 1,000 | 1.0 | 0.48 |
| 700 | 500 | 1.0 | 0.71 |
| 725 | 2,000 | 1.0 | 0.28 |
| 725 | 2,000 | 1.5 | 0.36 |
| 725 | 2,000 | 2.0 | 0.4 |
| 725 | 1,000 | 1.0 | 0.4 |
| 725 | 500 | 1.0 | 0.6 |

By extrapolation from the above data, it was determined that a product containing 0.3% by weight, or less, sulfur can be obtained with this feed stock when employing operating conditions within the scope of our invention, such as a pressure of 1,000 p.s.i.g. and a temperature of 730° F. with an LHSV of 0.7 or a temperature of 750° F. with an LHSV of 1.0.

EXAMPLE 7

In this example, a 50% reduced Kuwait crude containing nominally 4% by weight sulfur as well as residual components and metalliferous contaminants was subjected to hydrodesulfurization in accordance with our process employing a catalyst containing 0.5% nickel, 1% cobalt and 8% molybdenum on the particular alumina carrier required in our process. The feed stock was subjected to treatment employing a variety of operating conditions during an extended run with the temperature varying from 700° to 750° F., the pressure varying from 150 to 250 p.s.i.g. and the space velocity varying from 0.25 to 1. The hydrogen feed rate was maintained at 5,000 standard cubic feet per barrel throughout the run. The follow- From the above data obtained for the period from 8 through 292 hours, it will be seen that the process of our invention was effective to remove substantial quantities of sulfur from the feed stock employing extremely low pressures, i.e. 250 p.s.i.g. or less, and that such operations were effective employing space velocities as low as 0.25 while maintaining temperatures in the range below 800° F. It must also be pointed out that, as shown by the hydrogen content of the products obtained, the process of our invention did not effect extensive and undesired saturation of the treated material. In fact, the maximum increase in hydrogen content of the product was less than 5% over the hydrogen content of the feed stock.

During the onstream period from 268 to 292 hours, the operating conditions were returned to those employed during the initial onstream period from 8 to 32 hours as a means of determining catalyst aging. In this connection, it will be noted that the sulfur content of the product obtained had increased from 2.15% by weight up to 2.97% by weight. At this time an effort was made to regenerate the catalyst by flushing with a low aromatic content gas oil at the conditions indicated in the table. This flushing was continued for a period of 24 hours (onstream time 292 to 316 hours). Thereafter, feed stock was again charged to the reaction zone employing the initial operating conditions. The product obtained during the onstream period of 324 to 340 hours was identical to that obtained prior to flushing with the gas oil. Again, the catalyst was flushed with the same gas oil for a 24 hour period but employing a higher temperature and pressure. After the second flushing, feed stock was again charged to the reaction zone and the sulfur and metals content of the product obtained was determined. While the actual sulfur content obtained by the inspection was numerically lower than that determined prior to flushing with the gas oil, the value was within the range of experimental error inherent in the test method and, accordingly, is not considered to be a true variation from the sulfur content of the product obtained prior to flushing. This is further substantiated by the fact that metals content of the product after this second flushing was substantially identical to the metals content of the product obtained during the onstream period from 268 to 292 hours.

The catalyst bed was now flushed with anthracene oil employing a pressure of 500 p.s.i.g., a temperature of 750° F. and an LHSV of 1 volume of anthracene per volume of catalyst per hour and a hydrogen feed rate of 5,000 standard cubic feet of hydrogen per barrel of anthracene oil. After 20 hours of flushing with the anthracene oil, feed stock was once again charged to the reaction zone and subjected to treatment employing the initial operating conditions. It will be seen that the sulfur content of the product obtained after the anthracene flushing was substantially less than obtained prior to the flushing operations and, accordingly, demonstrates that such treatment with anthracene oil is effective in restoring the activity of the catalyst.

Finally, hydrogen flow through the catalyst bed was discontinued and the reaction system was purged with an inert gas. Thereafter, an oxidative burn-off was effected employing techniques well known in the art, such as, initially introducing a gas of low oxygen content and thereafter increasing the oxygen content so as to control burning rate and temperature. The temperature during this oxidative burn-off was maintained at a level below 1,000° F. throughout. After no further combustion could be effected in the catalyst bed, flow of the oxygen containing gas was discontinued, the system was purged with an inert gas and hydrogen flow was recommenced. Thereafter, feed stock was again charged to the reaction zone and the initial operating conditions were again employed in the treatment of the feed stock. It will be noted that during the onstream period from 472 to 480 hours a product was obtained wherein the sulfur, nickel and vanadium content was substantially identical to those obtained during the initial 8 to 32 hour onstream period thus indicating that the catalyst was completely regenerable. If anything, it should be noted that the regenerated catalyst is possibly an even more active desulfurization catalyst than was the fresh catalyst.

EXAMPLE 8

In this example, comparative runs were conducted employing two different nickel-cobalt-molybdenum catalysts. In one run, the catalyst carrier was comprised of 100% dihydrate, while in the other catalyst the carrier was the same as that employed in Example 4.

The catalyst supported on the 100% dihydrate carrier was employed in the treatment of a full Kuwait crude containing about 2% by weight sulfur for a period of 35 days utilizing operating conditions including a pressure from 1250 to 2400 p.s.i.g., a temperature range from 711 to 793° F., an LHSV ranging from 2 to 3 and a hydrogen feed rate of about 5,000 standard cubic feet per barrel. At the end of the 35 days operation, regeneration was attempted by effecting an oxidative burn-off at a temperature of 1000° F. in air. Subsequent to the oxidative treatment, the catalyst was again employed for treatment of the same feed stock at a temperature of 751° F., a pressure of 1000 p.s.i.g., an LHSV of about 1.98 and a hydrogen feed rate of about 10,000 s.c.f./b.

After the completion of the 45 day run described in Example 4, the catalyst of our invention was subjected to an oxidative burn-off for a period of about 16 hours at a temperature ranging from 750° to about 900° F. Subsequent to the oxidative burn-off, the regenerated catalyst of our invention was again employed for the treatment of a 50% reduced Kuwait crude containing about 4% by weight sulfur at a temperature of about 710° F., a pressure of 500 p.s.i.g., an LHSV of 0.5 and a hydrogen feed rate of about 500 s.c.f./b.

The sulfur content of the various products obtained at various time intervals together with the desulfurization effected at such times for both catalysts in the fresh and regenerated states are shown in Table IV.

TABLE IV

| Fresh | | | | | | Regenerated | | | | | |
|---|---|---|---|---|---|---|---|---|---|---|---|
| 100% dihydrate | | | Carrier of Ex. 4 | | | 100% dihydrate | | | Carrier of Ex. 4 | | |
| Time, hrs. | S, percent by wt. | DeS, percent | Time, hrs. | S, percent by wt. | DeS, percent | Time, hrs. | S, percent by wt. | DeS, percent | Time, hrs. | S, percent by wt. | DeS, percent |
| 0–8 | 0.53 | 73.5 | | | | 0–8 | 0.64 | 68.0 | | | |
| 8–16 | 0.51 | 74.5 | 8–20 | 1.08 | 73.2 | 8–16 | 0.73 | 63.5 | 8–24 | 1.06 | 73.7 |
| 16–24 | 0.55 | 72.5 | | | | 16–24 | 0.81 | 59.5 | | | |
| 24–32 | 0.56 | 72.0 | 20–32 | 1.09 | 73.0 | 24–32 | 0.86 | 57.0 | | | |
| 32–40 | 0.54 | 73.0 | | | | 32–40 | 0.87 | 56.5 | | | |
| | | | 32–44 | 1.09 | 73.0 | | | | 24–48 | 0.90 | 77.6 |
| | | | 44–56 | 1.13 | 72.9 | | | | | | |
| | | | 56–68 | 1.15 | 71.5 | | | | 48–72 | 1.18 | 70.7 |
| | | | 68–80 | 1.15 | 71.5 | | | | | | |
| | | | 80–92 | 1.16 | 71.2 | | | | 72–96 | 1.16 | 71.2 |
| | | | 92–104 | 1.20 | 70.8 | | | | | | |
| | | | 104–116 | 1.18 | 70.7 | | | | 96–120 | 1.22 | 69.8 |

From the data in the above table, it will be seen that the desulfurization effected during initial operation with both the 100% dihydrate carrier and the carrier of Example 2 are quite similar. If anything, the 100% dihydrate catalyst shows a slightly greater aging rate than the catalyst employed in the carrier of Example 2. After substantially the same oxidative burn-off, it will be noted that the desulfurization effected with the 100% dihydrate catalyst is substantially less than that effected with either of the fresh catalysts. Further, it will be seen that the regenerated 100% dihydrate catalyst deactivated at a drastic and totally unacceptable rate. As distinguished from this, it will be noted that the regenerated catalyst of the type required by our invention was restored to substantially the activity level of the fresh catalyst and that the deactivation rate of the catalyst of our invention was extremely low and substantially identical to that of the fresh catalyst.

EXAMPLE 9

In this example, a plurality of runs were conducted for the desulfurization of a 50% reduced Kuwait crude having a sulfur content of about 4% by weight and employing operating conditions of 700° F., 1,000 p.s.i.g., an LHSV of about 1 and a hydrogen feed rate of about 5,000 s.c.f./b. In each of the runs of this example, a carrier was employed having a different quantity of trihydrate in the carrier. All of the catalyst, however, contained about 0.5% by weight nickel, 1% by weight cobalt and 8% by weight molybdenum.

As demonstrated previously, the particular catalyst required by the present invention exhibits an improved aging rate over that of prior art catalysts. The purpose of the present runs was to determine a range of particularly advantageous catalysts wherein the previously demonstrated improved aging is coupled with higher initial activity. The particular measure of activity employed in this example is Specific activity for hydrodesulfurization measured as (Percent Desulfurization/BET Surface Area in square meters per gram) $\times 10^2$.

The following Table V shows the trihydrate content, surface area, sulfur content of product, desulfurization and specific activity for the runs employing the several catalysts.

TABLE V

| Trihydrate content percent by wt. | Surface area, m.²/g. (BET) | S, percent by wt. | DeS, percent | Specific HDS activity [1] |
|---|---|---|---|---|
| 0 | 265 | 1.25 | 68.75 | 25.9 |
| 2.5 | 219.8 | 1.18 | 70.5 | 32.1 |
| 10 | 198.3 | 1.05 | 73.75 | 37.2 |
| 16.5 | 236.8 | 1.35 | 66.25 | 27.9 |
| 18.5 | 289.6 | 1.36 | 66.0 | 22.8 |

[1] See the following:
$$\frac{\text{Percent DeS}}{\text{S.A. (BET)}} \times 10^2$$

From the above data, it can be seen that the presence of from about 2% by weight up to about 18% by weight trihydrate provides a particularly preferred carrier composition yielding an enhanced specific activity resulting in increased desulfurization.

EXAMPLE 10

In this example, a 50% reduced Kuwait crude containing nominally 4% by weight sulfur and a substantial quantity of residual components including both asphaltenes and maltenes was subjected to solvent extraction with normal pentane to provide an asphaltene fraction (insoluble in normal pentane) and a maltene fraction (soluble in normal pentane). The maltene fraction comprised about 91.5% by volume and about 89.4% by weight of 50% reduced crude corresponding to about 45.8% by volume on crude. This fraction had a sulfur content of about 3.7% by weight, a vanadium content of 27 p.p.m. and a nickel content of about 9 p.p.m. The asphaltene fraction comprised about 8.5% by volume and about 10.6% by weight based on the 50% reduced Kuwait crude and about 4.2% by volume based on the full crude. The asphaltene fraction had a sulfur content of about 8.6% by weight, a vanadium content of 497 p.p.m. and a nickel content of 178 p.p.m.

The maltene fraction is subjected to hydrodesulfurization in accordance with our invention employing a temperature of 750° F., a presure of 500 p.s.i.g., a liquid hourly space velocity of 0.5 and a hydrogen feed rate of 5,000 standard cubic feet per barrel. The catalyst employed is the same nickel, cobalt and molybdenum catalyst of our invention described in previous examples. The product obtained from the low pressure hydrodesulfurization of the maltene fraction contains about 0.39% by weight sulfur and the yield of desulfurized material is substantially 100%. The desulfurized maltene fraction is then blended back with the undesulfurized asphaltene fraction in the same proportions of the fractions as are present in the reduced crude. This reblending is effective to produce a material containing about 1% by weight sulfur.

The particular technique of separately desulfurizing the maltenes fraction provides an advantageous method for producing a product of reduced sulfur content in that the metalliferous contaminants are more heavily concentrated in the asphaltene components than in the maltene components. In this manner, a maltene fraction of comparatively low metals content can be subjected to a more extensive desulfurization with a reduced metals removal per quantity of sulfur removed thereby reducing the amount of metals deposition on the catalyst. Further, this desulfurization is effected by the treatment of a fraction containing components having a reduced coking tendency, i.e. maltenes rather than asphaltenes, thereby contributing further to increased catalyst life. Finally, this production of final product of reduced sulfur content is not only effected by treating a fraction of lower metals content and reduced coking tendency, but is also effected by the treatment of a reduced quantity of material.

EXAMPLE 11

In this example, a 50% reduced Kuwait crude containing substantial quantities of sulfur, metalliferous contaminants and residual components is subjected to hydrodesulfurization in accordance with our invention employing a hydrogen partial pressure of about 500 p.s.i.a., a temperature of about 750° F. and a space velocity of about 0.5. The alumina carrier employed is that required in our process. Three separate runs are conducted employing three different catalysts wherein the metalliferous hydrogenating components are different. In one catalyst, the hydrogenating components comprise cobalt and molybdenum; in the second catalyst, the hydrogenating components comprise nickel and tungsten, while in the third catalyst the hydrogenating component comprises palladium. Each of these catalysts is effective to produce a product containing about 1% by weight sulfur.

We claim:

1. A process for hydrodesulfurizing a feed residual oil comprising contacting the feed oil and hydrogen with a hydrosulfurization catalyst at a temperature of about 600 to about 1,000° F., a liquid hourly space velocity of from about 0.1 to about 10 volumes of feed oil per volume of catalyst per hour and a hydrogen feed rate of from about 500 to about 10,000 standard cubic feet of hydrogen per barrel of feed oil, said catalyst comprising a minor amount of Group VI and Group VIII metals with a major amount of an alumina carrier containing less than 1 weight percent silica, said alumina carrier composited of a first alumina obtained by drying and calcining a crystalline alumina trihydrate and a second alumina obtained by drying and calcining a crystalline alumina hydrate containing from 1.2 to 2.6 mols of water of hydration per mol of $Al_2O_3$, the alumina trihydrate comprising an amount from about 2 to about 35 weight percent of the total of said hydrates which increases the specific hydrodesulfurization activity of said catalyst.

2. The process of Claim 1 wherein the alumina carrier contains less than 0.5 weight percent silica.

3. The process of Claim 1 wherein the alumina trihydrate comprises at least 5 weight percent of the total of said hydrates.

4. The process of Claim 1 wherein the alumina trihydrate comprises about 2 to about 18 weight percent of the total of said hydrates.

5. The process of Claim 1 wherein the hydrogen pressure is 50 to 1,200 p.s.i.

6. The process of Claim 1 wherein the hydrogen pressure is less than 1,000 p.s.i.

7. The process of Claim 1 wherein said alumina hydrates are admixed prior to calcination and the admixture is then calcined.

8. The process of Claim 1 wherein said alumina hydrates are formed by precipitating the alumina hydrate containing from 1.2 to 2.6 mols of water of hydration per mol of $Al_2O_3$ from a solution of an aluminum salt, a pH in the range from 7 to about 12 being maintained during at least a portion of the precipitation, transforming a portion of the alumina hydrate thus precipitated to an alumina trihydrate by contacting the precipitated alumina hydrate with water, and then drying and calcining the mixture of alumina hydrates.

9. In the process of Claim 1, passing the feed oil and hydrogen over the catalyst until the catalyst becomes deactivated, discontinuing contacting of the catalyst and feed oil, contacting the deactivated catalyst with an aromatic solvent and at least about 500 standard cubic feet of hydrogen per barrel of solvent at a pressure of at least 250 p.s.i., a temperature of at least about 500° F. and at a liquid hourly space velocity of at least 0.1 volume of solvent per volume of catalyst per hour whereby the catalyst is substantially reactivated, discontinuing contacting of the the catalyst with solvent, and recontacting the reactivated catalyst with the feed oil to hydrodesulfurize said feed oil.

10. In the process of Claim 1, passing the feed oil and hydrogen over the catalyst until the catalyst becomes deactivated, discontinuing contacting of the catalyst and feed oil, subjecting the deactivated catalyst to an oxidative burn-off to reactivate the catalyst, and recontacting the reactivated catalyst with feed oil to hydrodesulfurize said feed oil.

11. The process of Claim 10 wherein the oxidative burn-off occurs at a temperature of less than about 1,000° F.

References Cited
UNITED STATES PATENTS

| | | | |
|---|---|---|---|
| 3,340,180 | 9/1967 | Beuther et al. | 252—465 |
| 3,242,101 | 3/1966 | Erickson et al. | 208—216 |
| 2,943,065 | 6/1960 | Braithwaite | 252—465 |
| 3,188,174 | 6/1965 | Kehl et al. | 252—465 |
| 3,440,073 | 5/1969 | Buether et al. | 208—211 |
| 3,505,206 | 4/1970 | Decker | 252—414 |
| 3,076,755 | 2/1963 | Stark et al. | 252—416 |

DELBERT E. GANTZ, Primary Examiner

C. E. SPRESSER, JR., Assistant Examiner

U.S. Cl. X.R.

208—211; 252—414, 416, 465